United States Patent [19]
Yaniv et al.

[11] Patent Number: 5,839,753
[45] Date of Patent: Nov. 24, 1998

[54] INFLATABLE TUBULAR TORSO RESTRAINT SYSTEM

[75] Inventors: Gershon Yaniv, Scottsdale, Ariz.; David J. Romeo, Etna, Wyo.; Dirk J. Hardtmann, Phoenix; Lindley W. Bark, Chandler, both of Ariz.

[73] Assignee: Simula Inc., Phoenix, Ariz.

[21] Appl. No.: 829,750

[22] Filed: Mar. 31, 1997

[51] Int. Cl.$^6$ .................................................. B60R 21/18
[52] U.S. Cl. ........................................... 280/733; 280/808
[58] Field of Search .............................. 280/728.1, 733, 280/743.1, 808

[56] References Cited

U.S. PATENT DOCUMENTS

| | | |
|---|---|---|
| 2,834,606 | 5/1958 | Bertrand . |
| 3,040,383 | 6/1962 | Nassimbene . |
| 3,316,337 | 4/1967 | North . |
| 3,642,303 | 2/1972 | Irish et al. . |
| 3,682,498 | 8/1972 | Rutzki . |
| 3,687,485 | 8/1972 | Campbell . |
| 3,730,551 | 5/1973 | Sack et al. . |
| 3,784,223 | 1/1974 | Hass et al. . |
| 3,792,873 | 2/1974 | Buchner et al. . |
| 3,807,754 | 4/1974 | Rodenbach et al. . |

(List continued on next page.)

FOREIGN PATENT DOCUMENTS

| | | |
|---|---|---|
| 2442058 | 6/1980 | France . |
| 2606719 | 5/1988 | France . |
| 2675098 | 10/1992 | France . |
| 38 20 145 A1 | 1/1990 | Germany . |
| 92 11 423.7 | 8/1992 | Germany . |
| 9211423 U | 8/1992 | Germany . |
| 42 38 427 A1 | 5/1993 | Germany . |
| 43 07 175 A1 | 9/1993 | Germany . |
| 295 17 953 U | 2/1996 | Germany . |
| 1-156155 | 6/1989 | Japan . |
| 2-237837 | 9/1990 | Japan . |
| 3- 92451 | 4/1991 | Japan . |
| 3-276844 | 12/1991 | Japan . |
| 5-193430 | 8/1993 | Japan . |
| 5-208653 | 8/1993 | Japan . |
| 1381999 | 1/1975 | United Kingdom . |
| 2191450 | 12/1987 | United Kingdom . |
| 2261636 | 5/1993 | United Kingdom . |
| 1320475 | 6/1993 | United Kingdom . |
| 2262720 | 6/1993 | United Kingdom . |
| WO90/11914 | 10/1990 | WIPO . |
| WO94/19215 | 9/1994 | WIPO . |

OTHER PUBLICATIONS

Arizona Republic Newspaper, "Car Air Bags for Side Hits in the Works," Mar., 1994.
Aviation Week and Space Technology, "Army Develops Crew Restraint System," vol. 120, No. 3, Jan. 16, 1984, New York, USA, p. 187.
Japanese Patent Abstract No. 111 vol. 16 of Patent No. A–3 281 455 to Hideki, Issued on Dec. 12, 1991.
Livbag product brochure, "Specifications for Euroflator Gas Generator and Safety Data Sheet," Aug., 1992.
Popular Science, "Side Protection Coming," Dec., 1993.

*Primary Examiner*—Paul N. Dickson
*Attorney, Agent, or Firm*—Crowell & Moring LLP

[57] ABSTRACT

A seat restraint system whose torso belt inflates upon impact to protect the occupants of a vehicle such as an automobile. The inflating component of the present invention is a braided tube linked to a gas generator and crash sensor. When an impact is detected, the gas generator is ignited, inflating the braided tube. As the braided tube inflates, the diameter of the tube increases significantly and its length decreases significantly, due to the orientation of the fibers comprising the braided tube. The contracting tube pretensions the seat belt system by pulling any slack out of the seat belt systems. The inflated structure restricts the forward motion of an occupant and distributes crash loads over a larger occupant surface area to reduce both primary and secondary injuries. In a side impact the inflated structure restricts occupant motion, distributes crash loads and provides head protection.

50 Claims, 5 Drawing Sheets

U.S. PATENT DOCUMENTS

| | | |
|---|---|---|
| 3,841,654 | 10/1974 | Lewis . |
| 3,844,581 | 10/1974 | Fox . |
| 3,866,940 | 2/1975 | Lewis . |
| 3,888,503 | 6/1975 | Hamilton . |
| 3,888,504 | 6/1975 | Bonn et al. . |
| 3,892,425 | 7/1975 | Sakairi et al. . |
| 3,905,615 | 9/1975 | Schulman . |
| 3,929,205 | 12/1975 | Takada et al. . |
| 3,948,541 | 4/1976 | Schulman . |
| 3,953,049 | 4/1976 | Surace et al. . |
| 3,953,640 | 4/1976 | Takada . |
| 3,970,329 | 7/1976 | Lewis . |
| 4,348,037 | 9/1982 | Law et al. . |
| 4,592,523 | 6/1986 | Herndon . |
| 4,805,930 | 2/1989 | Takada . |
| 4,921,735 | 5/1990 | Bloch . |
| 4,971,354 | 11/1990 | Kim . |
| 5,018,762 | 5/1991 | Suzuki et al. . |
| 5,039,035 | 8/1991 | Fitzpatrick . |
| 5,062,662 | 11/1991 | Cameron . |
| 5,251,931 | 10/1993 | Semechena et al. . |
| 5,282,648 | 2/1994 | Peterson . |
| 5,303,953 | 4/1994 | Kamiyama et al. . |
| 5,312,131 | 5/1994 | Kitagawa et al. . |
| 5,322,322 | 6/1994 | Bark . |
| 5,346,250 | 9/1994 | Kamiyama . |
| 5,354,096 | 10/1994 | Tanaka et al. . |
| 5,383,713 | 1/1995 | Kamiyama et al. . |
| 5,385,367 | 1/1995 | Tanaka et al. . |
| 5,390,953 | 2/1995 | Tanaka et al. . |
| 5,393,091 | 2/1995 | Tanaka et al. . |
| 5,445,411 | 8/1995 | Kamiyama et al. . |
| 5,446,003 | 8/1995 | Augustine et al. . |
| 5,464,246 | 11/1995 | Castro et al. . |
| 5,465,999 | 11/1995 | Tanaka et al. . |
| 5,466,002 | 11/1995 | Tanaka et al. . |
| 5,480,181 | 1/1996 | Bark et al. . |

FIG. 3a-1 — CONVENTIONAL THREE-POINT SEAT BELT BASELINE FORWARD IMPACT
HEAD DISPLACEMENT = 20.5-IN.
HEAD ROTATION = 110°

FIG. 3a-2 — AIRBELT-1 FORWARD IMPACT
HEAD DISPLACEMENT = 18.0-IN.
HEAD ROTATION = 61°

FIG. 3a-3 — AIRBEST-2 FORWARD IMPACT
HEAD DISPLACEMENT = 14.5-IN.
HEAD ROTATION = 42°

FIG. 3a-4 — PRESENT INVENTION FORWARD IMPACT
HEAD DISPLACEMENT = 5.0-IN.
HEAD ROTATION = 28°

HEAD DISPLACEMENT= 23.0-IN.
HEAD ROTATION = 86°

CONVENTIONAL THREE-POINT
SEAT BELT BASELINE
LATERAL IMPACT

*FIG. 3b-1*

HEAD DISPLACEMENT= 24.0-IN.
HEAD ROTATION = 74°

AIRBELT-1 LATERAL IMPACT

*FIG. 3b-2*

HEAD DISPLACEMENT= 20.5-IN.
HEAD ROTATION = 15°

AIRBELT-2 LATERAL IMPACT

*FIG. 3b-3*

HEAD DISPLACEMENT=15.3-IN.
HEAD ROTATION = 50°

PRESENT INVENTION
LATERAL IMPACT

*FIG. 3b-4*

INFLATABLE TUBULAR TORSO RESTRAINT SYSTEM

This application claims priority from U.S. provisional patent Application Ser. No. 60/021,052, filed Jul. 2, 1996.

BACKGROUND

Field of the Invention

This invention relates to a system for restraining the body of an occupant in a vehicle to reduce the extent and severity of injuries during a crash. More specifically, the invention relates to a seat belt restraint system which incorporates an inflatable tubular section in the torso section of the belt. The inflatable tubular section is made of a woven or braided tube of continuous high-strength fibers. The restraint system reduces the extent and severity of both primary and secondary injuries to vehicle occupants.

Background of the Invention

Conventional seat belts are designed to protect the occupants of vehicles such as automobiles, trucks, vans, airplanes and helicopters from primary injuries during an accident. Primary injuries are injuries caused by the initial impact of the occupants against the interior of the vehicle. However, the protection provided by conventional seat belts against primary injuries may sometimes be inadequate. For example, slack in the seat belts may lead to unnecessarily serious primary injuries. In side impacts conventional belts do not provide occupant head protection on the struck side of the vehicle. Moreover, the seat belts themselves may often be responsible for secondary injuries, since the load from the seat belts is distributed only over small areas of the occupant's body. However, some prior art belts have tried to lessen primary injuries by incorporating an inflating mechanism into the seat belt restraint.

For example, U.S. Pat. No. 5,282,648, which is incorporated by reference herein, discloses an inflatable body and head restraint system, wherein inflatable bladders are attached to the shoulder straps of a harness restraint. The bladders are stowed partially underneath and partially on top of harness straps. This configuration provides stability and prevents the bladders from rolling out of position during inflation. During a crash, the bladders inflate to protect the upper body, primarily the head and neck of the occupant.

Additionally, U.S. Pat. Nos. 3,948,541 and 3,905,615 to Schulman disclose another inflatable body and head restraint system, wherein a bladder is securely affixed to shoulder straps and a lap belt. The bladder has chin, chest, and pelvic bags. Upon impact, the bladder automatically inflates to cushion the pelvic areas and to prevent forward rotation of the head. However, upon inflation the bladder tends to roll out from its position under the shoulder straps. Also, because the bladders are constricted by the harness, portions of the bladder are subjected to high pressures, which can lead to splitting of the bladder.

Simple inflatable body restraints are also disclosed in U.S. Pat. Nos. 3,682,498 and 4,348,037 to W. Rutzki and B. Law et al, respectively. These patents disclose inflatable protective devices that are located in or under the seat harnesses to which they are attached. These inflatable body restraints are subject to roll-out and seam or web splitting problems.

In yet another prior art seat belt disclosed in, U.S. Pat. Nos. 3,841,654 and 3,970,329 both to Lewis, a vehicle seat system which comprises a seat belt having an inflatable section is shown. When a collision is detected, the inflatable section is inflated to protect the person wearing the seat belt.

The prior art inflatable seat belt structures, such as those identified above, generally use a unitary inflatable section made from a tightly woven material, such as 420 denier nylon, which is conventional air bag material. When deployed, the inflatable section will contract in length somewhat because the inflation pressure causes it to go from a flat, generally 2-dimensional shape to a 3-dimensional cylindrical shape. However, only the of the inflatable section contract as they fill and assume a hemispherical shape. This causes only the ends of the inflatable section to shorten, thus shortening the overall length of the inflatable section. The fibers of the material do not change their orientation: the two sets of fibers in the material remain roughly perpendicular to each other throughout the inflation process.

In the case of the typical inflatable seat belt made of conventional air bag material as described above, the maximum theoretical amount that the inflatable structure contracts upon inflation, in an unconstrained condition prior to being loaded by the occupant, is based only on the width of the flat material. If inflation results in a relatively small cylindrical diameter then a relatively small contraction, or shortening, of the length of the seat belt will occur. The calculation for determining the amount of contraction that will occur with conventional air bag material upon inflation and in an unconstrained condition is as follows:

$$Lf-Li=X \quad (1)$$

where:

X is the amount of contraction

Lf is the length of flat, uninflated, material

Li is the length of unconstrained inflated material, and $$Li=Lf-(Df-Di) \quad (2)$$

$$Di=2/\pi(Df) \quad (3)$$

$$Lf-Li=Df(1-2/\pi) \quad (4)$$

where:

Df is the width (flat diameter) of flat, uninflated, material
Di is the diameter of unconstrained inflated material.

As seen in equation (4), the length reduction depends solely on the uninflated width (flat diameter) of the material.

For example, an inflatable structure having a flat diameter of 20 cm and a flat length of 100 cm has a maximum achievable contraction of 7.3 cm or roughly 7%. This degree of contraction would provide restraint that is only slightly greater, and, thus, only slightly more protective than a conventional seat belt.

The construction disclosed in U.S. Pat. No. 3,888,503 to Hamilton comprises an inflatable restraining band having a series of sections, some of which are inflatable to a greater degree than others interconnecting them. In the Hamilton design, contraction occurs upon inflation only at each end of each section, and because the sections are of variable inflatable size, the amount of contraction varies along the structure. By not allowing full expansion of interconnecting portions or sections of the inflatable band more hemispherical "ends" occur thus the overall band is foreshortened to a greater extent than otherwise on expansion, which causes greater tensioning of the band against the occupant restrained.

Hamilton provides greater protection than the conventional inflatable seat belt in terms of the provision of greater restraint and hence improves upon a conventional inflatable seat belt. However, the restraint that results from Hamilton's patent is still significantly less than the restraint provided by the present invention.

None of the patents described above provide the important advantage of significant contraction which occurs as a result of both inflation and construction of the woven material used in the present invention.

SUMMARY OF THE INVENTION

The present invention is a seat restraint system having an inflatable torso section, connected to a gas generator and crash sensor, that shortens greatly as it inflates. The invention is intended to replace conventional automotive seat belts. It can also be used in other types of vehicles and moving structures, such as trucks, vans, airplanes, railroad trains, elevators and helicopters.

The inflatable torso section of the seat belt system comprises a braided tube of continuous high-strength fibers, not the conventional material used for air bags. The fibers of the braided tube of the present invention form spirals and change their orientation upon inflation. Prior to inflation, the spirals are stretched-out longitudinally and the tubular restraint has a relatively small diameter. Subsequent to inflation, the spirals are closer together longitudinally and form a relatively large tubular diameter. That is, upon inflation, the braided tube significantly increases its diameter and significantly decreases its length. This contraction occurs because when the tube is inflated, the fibers seek an orientation that allows a lower resultant stress and hence a larger volume within the tube. In order to provide superior gas retention, the braided tube may additionally contain an inner bladder.

In the uninflated state, the braided tube assumes a flat woven belt configuration and acts as a conventional seat belt system and holds the occupant in the seat. However, as the braided tube inflates, the decreasing tube length acts as a pretensioning device by drawing any slack out of the seat belt system. The shortened length of the braided tube helps greatly to further restrict subsequent occupant motion.

The inflated braided tube additionally provides a much larger restraint surface area for the occupant's body, which helps to distribute belt load forces. When the inflated braided tube is loaded by the occupant's body, it flattens slightly. This flattening increases the contact area between the body and the braided tube, thus further reducing the pressure on the occupant. In a side impact the inflated section provides occupant head protection.

The inflatable braided tube is connected to a gas generator which is in turn connected to a crash sensor. When the crash sensor detects an impact above a predetermined threshold, it sends a signal to the gas generator. The gas generator is initiated inflating the braided tube. The gas generator can be integrated within the seat back or base for sound damping purposes and/or other practical considerations.

The primary function of the present invention is to prevent or reduce the severity of primary and secondary injuries suffered by a vehicle occupant in the event of a crash, by pretensioning the restraint system, further restricting the motion of the occupant's body, and by distributing the restraint forces over a larger surface area.

Eight crash tests simulating four equivalent frontal and four equivalent side impacts were conducted to compare the restraining capability of the present invention to a conventional three-point seat belt, and to two air belt systems. The first air belt was inflated to a relative peak inflation pressure of approximately 1 bar, and the second air belt was inflated to a relative peak inflation pressure of approximately 3 bars.

The results of these tests are listed in Table 1. As shown by Table 1, the first air belt shows essentially no improvement over the conventional three-point seat belt. The second air belt shows some improvement 20 compared to a conventional three-point seat belt, i.e., head displacement was reduced by six inches in the forward crash simulation and by 2.5 inches in the side impact simulation. Head rotation, a possible indicator of neck injuries, was also reduced. However, the restraint system manufactured according to the present invention, inflated to a peak inflated pressure of approximately 2 bars, produced the greatest improvements in occupant kinematics: head displacement was reduced by 15.5 inches (from 20.5 inches to 5.0 inches) in the forward direction) and by 8 inches (from 23 inches to 15 inches) in the lateral direction. The superior performance of the present invention is due to its ability to reduce its overall length to a greater extent than prior art restraints.

Accordingly, it is an object of the present invention to provide a protective seat belt system that inflates on impact to protect the occupant of a vehicle.

It is another object of the present invention to provide a protective apparatus that restricts occupant motion during a crash.

It is another object of the present invention to provide an inflatable braided tube member that greatly shortens (by at least 10% to 30%) as it inflates to pretension the restraint system.

It is another object of the present invention to provide an inflatable braided tube that distributes crash loads over larger occupant surface area, thus minimizing pain and potential injury.

It is another object of the present invention to provide an inflatable braided tube that is not subject to roping, roll-out or seam splitting problems.

It is another objective of the present invention to provide an inflatable braided tube that pretensions with a force sufficient to counter body loading.

These and other objects of the present invention are described in greater detail in the detailed description and the appended drawings.

DETAILED DESCRIPTION OF THE INVENTION

The preferred embodiment of the invention is shown in the uninflated and inflated configurations in FIGS. 1a through 1e installed with respect to a typical driver-side automobile seat 121. A mirror image of the invention would function equally as well on a passenger-side automobile seat.

Figure 1A:
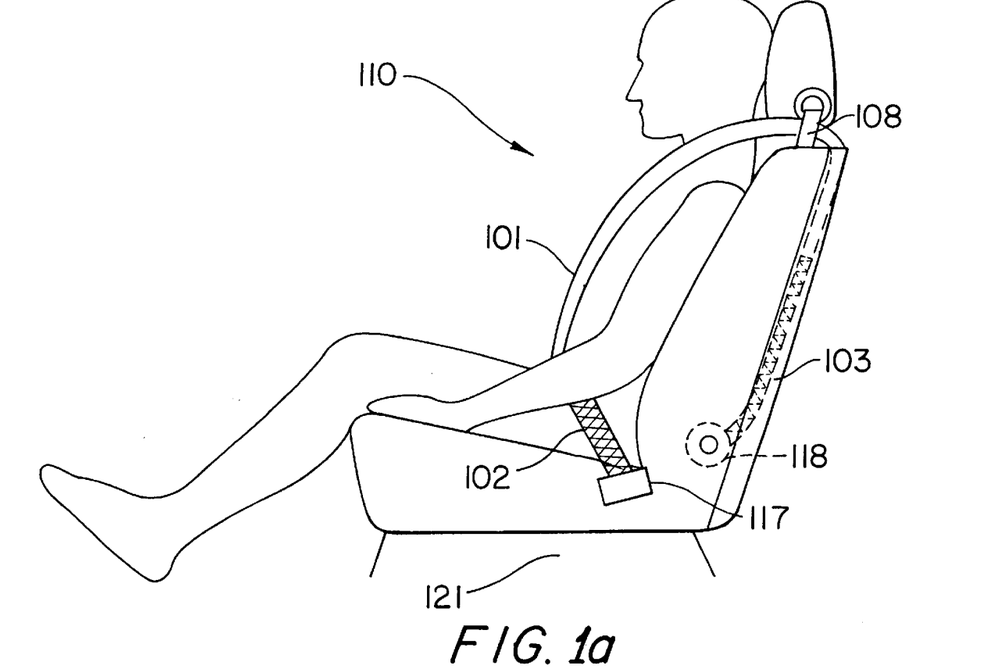
FIG. 1a is a schematic diagram of a side view of the present invention in the uninflated configuration.
Figure 1B:
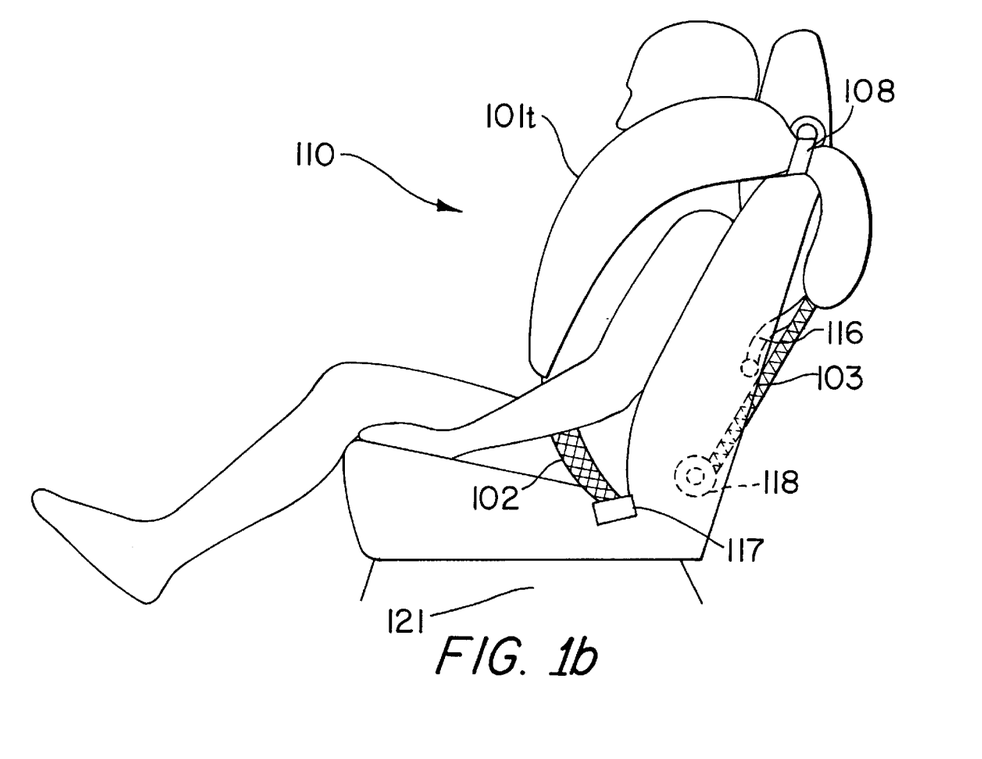
FIG. 1b is a schematic diagram of a side view of the present invention in the inflated configuration.
Figure 1C:
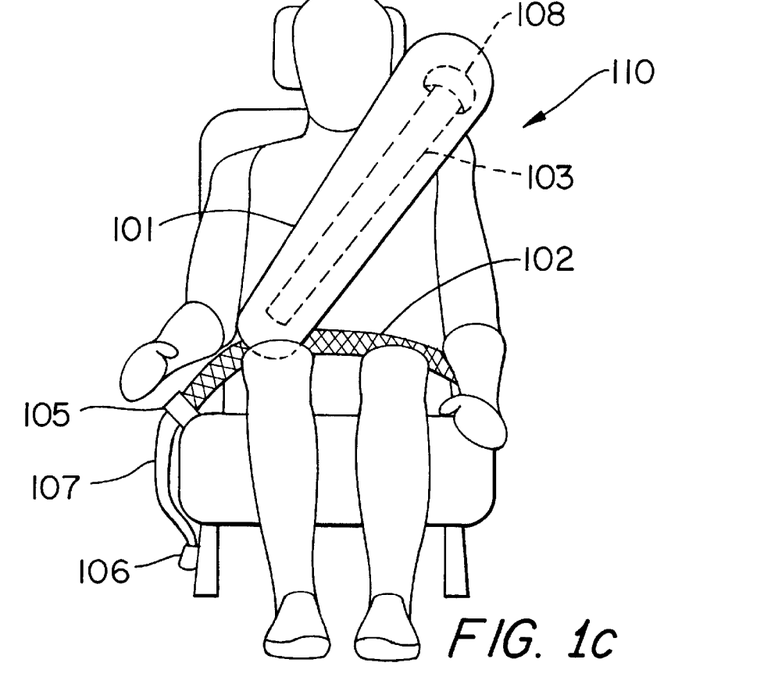
FIG. 1c is a schematic diagram of a front view of the present invention in the inflated configuration installed with respect to the driver-side seat of a typical automobile.

As shown in the FIGS. 1a–1e, the seat belt system 110 of the present invention comprises lap belt 102, shoulder or torso belt 103, including an inflatable section 101 comprising a torso portion 101t, buckle assembly 105, anchor 106, anchored inertial reels 117 and 118, gas generator 122, and sensor assembly (not shown). As shown in FIG. 1c, lap belt 102 and torso belt 103 form one continuous strap which passes through the male portion of buckle assembly 105. Lap belt 102 is designed to restrict the forward motion of a seated occupant at the pelvis. The lap belt 102 is connected to anchored inertial reel 117 that pivotally mounts lap belt 102 to the floor or seat structure on the door-side of seat 121 (as shown in FIGS. 1a and 1b). The other end of lap belt 102 loops through the male portion of buckle assembly 105, so that the length of the lap belt 102 can be adjusted to accommodate a wide range of seated occupants. The female portion of buckle assembly 105 is attached to buckle strap 107. Buckle strap 107 is pivotally mounted to an attachment point in the vehicle, such as the base of seat 121, or a floor structure on the side of seat 121 that is furthest from the door, by anchor 106. The female and male portions of buckle assembly 105 fasten together, thus securing seat belt system 110 around the occupant in a manner similar to that used by conventional three point seat belt systems.

Figure 1D:
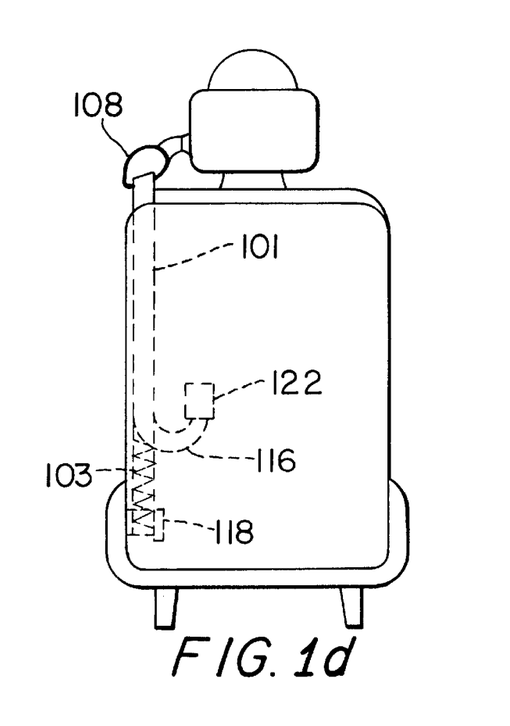
FIG. 1d is a schematic diagram of cut-away rear view of the present invention in the uninflated configuration installed with respect to the driver-side seat of a typical automobile.
Figure 1E:
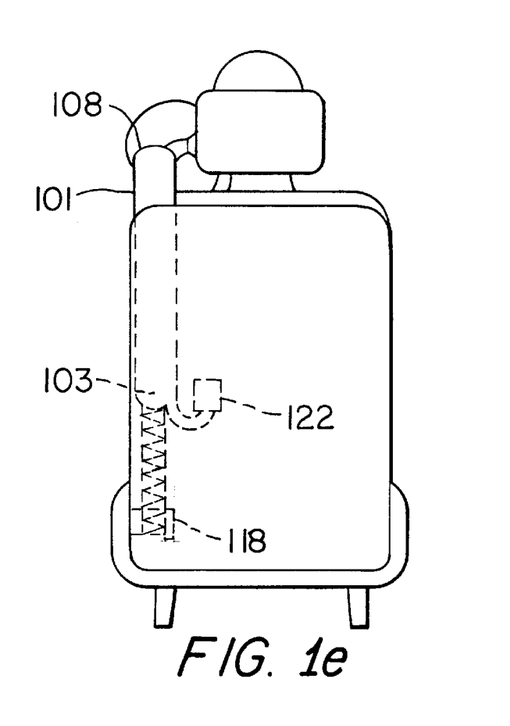
FIG. 1e is a schematic diagram of a cut-away rear view of the present invention in the inflated configuration installed with respect to the driver side seat of a typical automobile.

As shown in FIG. 1d gas generator 122 is preferably mounted inside the seat back to protect it from impacts and to dampen the noise it produces when activated. The gas generator could also be located in the seat base (not shown). Durable tubing 116 provides a fluid path from gas generator 122 to inflatable braided tube 101.

As shown in FIG. 1a, inflatable section 101 extends diagonally from the occupant's hip to behind and above the occupant's shoulder and is attached to torso belt 103. The upper end of inflatable section 101 loops through a D-ring 108 that is mounted to the seat 121 as shown or to the vehicle (e.g., at the roof rail or at the upper B-pillar area (not shown)). The torso belt 103 then is anchored to the seat 121 or vehicle (not shown) by an inertial retractor 118. As shown in FIG. 1a, torso strap 103 is preferably routed inside the vehicle seat to inertial retractor 118, which is mounted in the lower portion of the seat back. As discussed below with reference to FIG. 1d, gas generator 122 is preferably mounted inside the vehicle seat. Thus, in the configuration shown in FIGS. 1a and 1d, tubing 116 provides direct fluid communication from the gas generator to inflatable section 101 in the torso of the restraint system. Torso strap 103, buckle strap 107, and lap belt 102 are formed from conventional webbing material such as nylon, dacron, or polyester. Alternatively strap 107 could be a steel cable.

The key component of the safety belt system 110 is the inflatable braided tube 101. Braided tube 101 is integrated in the torso belt 103. The braided tube 101 is similar to the braided tubes disclosed in U.S. Pat. Nos. 5,322,322 and 5,480,181, which are incorporated by reference herein. Braided tube 101 is shown in detail in FIGS. 2a and 2b.

Braided tube 101 is comprised of a braided tube of continuous high-strength fibers. Typical fiber materials include aramid, nylon, dacron, polyamide and polyester fibers. Braided tube 101 is made of continuous fibers that may or may not be impregnated with elastomeric material, such as silicone rubber or urethane. Unlike the conventional air bag material fibers employed in prior art, the fibers of this invention form spirals and change their orientation (included longitudinal angles) upon inflation. Prior to inflation, the spirals are stretched-out longitudinally and the tubular restraint has a relatively small diameter. Subsequent to inflation, the spirals are closer together longitudinally and form a relatively large tubular diameter. That is, upon inflation, the entire braided tube increases its diameter and decreases its length, or contracts. This contraction occurs because as the tube is inflated, the fibers seek an orientation that allows a larger volume within the tube.

Figure 2A:
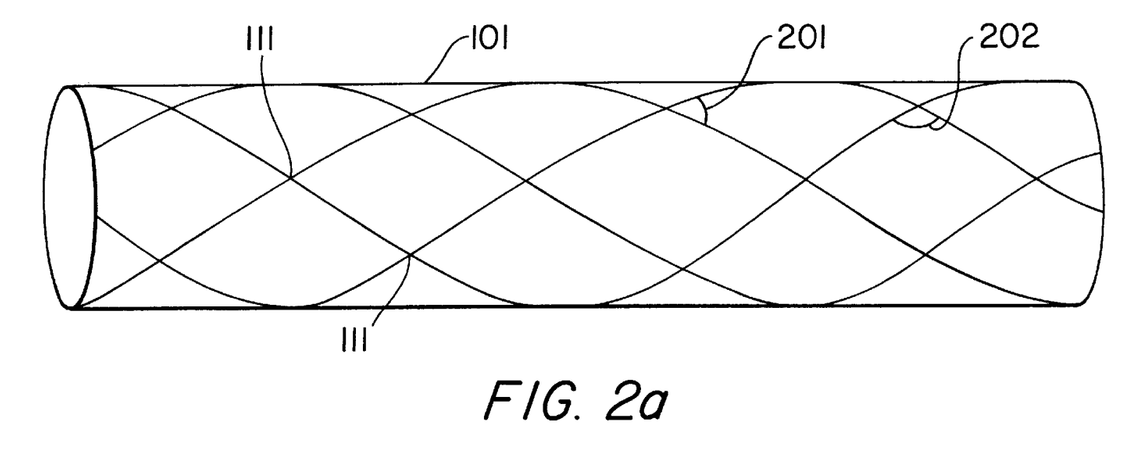
FIG. 2a is a schematic diagram of the braided tube of the present invention in the uninflated state.

As shown in FIG. 2a, angle 201 is a longitudinal angle and angle 202 is a circumferential angle. In the uninflated state, shown in FIG. 2a, braided tube 101 is elongated with its woven fibers forming obtuse and acute angles at the fiber crossing points 111. For the sake of convenience and clarity, the angles which are acute in FIG. 2a (which would be bisected by a line parallel to the longitudinal axis of the braided tube) will be termed the longitudinal angles. The angles which are obtuse in FIG. 2a (which would be bisected by a line parallel to the circumference of the braided tube) will be termed the circumferential angles.

When the braided tube is in the uninflated state, its fibers are at a longitudinal angle in the range of about 30° to about 70°. In every case, upon inflation, the fibers will seek a preferred maximum longitudinal angle of about 110° when the tube is in an unconstrained state. Typically, the angle after inflation is approximately 100° in an unloaded, or unconstrained, braided tube. Given the range of angle from about 30° to about 70° in an uninflated tube and an angle of about 100° in an unloaded inflated tube, the range of typical length decrease, or contraction, of the inflatable tube is about 21.5% (for the 70° to 100° change) to about 33.5% (for the 30° to 100° change). The percentage of contraction is irrespective of the initial diameter or length.

The calculation for determining the amount of contraction that will occur with the present invention upon inflation and in an unconstrained condition is as follows:

$$Lf-Li=X \qquad (5)$$

where:

X is the amount of contraction

Lf is the length of flat, uninflated, material, and

Li is the length of unconstrained inflated material and $$Li/Lf=\cos(\theta i/2)/\cos(\theta f/2) \qquad (6)$$

$$Lf-Li=Lf(1-\cos(\theta i/2)/\cos(\theta f/2)) \qquad (7)$$

where:

θf is the longitudinal angle prior to inflation

θi is the longitudinal angle after inflation.

Merely by way of example, an embodiment of the present invention having an uninflatable flat length of 100 cm and a flat diameter of 20 cm and constructed with fibers that cross each other at a 36° angle would decrease in length, or contract, to 67 cm or by approximately 33% upon inflation in an unconstrained condition. (The calculation assumes that the angle of the fibers in an unconstrained inflated braided tube will be 100°.)

As stated above, the invention contracts as a result of both inflation and construction. Therefore, it will typically contract about 21.5% to about 33.5% as a result of the change in orientation of the fibers (construction) plus an additional percent (Lf−Li=Df(1−2/π)) as a result of the geometrical change from a flat belt to a cylindrical belt with hemispherical ends.

The fibers in the braided tube form clockwise and counterclockwise spirals both prior to inflation and subsequent to inflation. Prior to inflation, the spirals are stretched-out longitudinally, and have a relatively small diameter. Subsequent to inflation, the spirals are closer together longitudinally, and have a relatively large diameter. This occurs because, as the tube is inflated, the tube fibers seek an orientation that allows a larger volume within the tube, and results in lower resultant stress, with fibers aligned to roughly parallel to the orientation of the resultant stress.

Figure 2B:
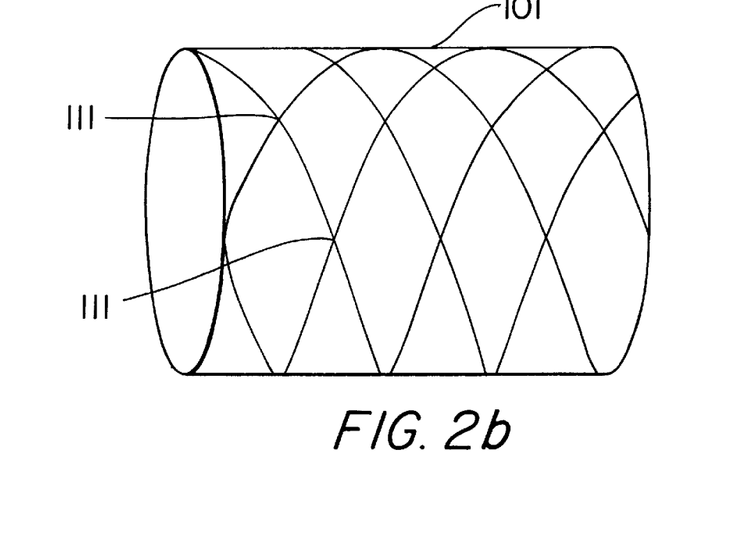
FIG. 2b is a schematic diagram of the braided tube of the present invention in the inflated state.

FIG. 2b shows that as it inflates, braided tube 101 shortens in length, while its diameter increases. The braid fibers ultimately seek an orientation in which the longitudinal angles increase substantially as the tube diameter increases. As the tube diameter increases, the tube length decreases. If the tube were unconstrained and the longitudinal angles of the tube were in the range of about 30° to about 70°, the typical range for unconstrained decrease of the tube length is about 20% to about 39%, preferably about 21.5% to about 33.5%, and most preferably about 33.5%.

The fibers in the uninflated braided tube typically have a longitudinal angle in the range of about 30° to about 70°. Upon inflation the longitudinal angle between the fibers will reach approximately 100°. The preferred maximum longitudinal inflation angle of the fibers is approximately 110°.

FIG. 1a shows seat belt system 110 of the present invention in the uninflated state in which braided tube 101 assumes a flat woven belt configuration and the system acts as part of a conventional 3-point restraint. The uninflated braided tube forms a high-strength belt that has the same width (approximately 2 inches) as the conventional webbing material of lap belt 102 and torso belt 103.

As best shown in FIG. 1d, when a collision occurs, the crash sensor sends a signal to the initiator in gas generator 122. The initiator then ignites the gas generator 122, thus producing a gas that passes through durable tubing 116 and inflates braided tube 101. As gas flows into the chamber of braided tube 101, the internal pressure causes the tube diameter to increase and the tube length to decrease. However, the seat belt system 110 is constrained on the outboard side by the first inertial reel 117 and on the inboard side by anchor 106, and behind the shoulder by the second (shoulder or torso belt) inertial reel 118. Inertial reels 118 lock up during impact, preventing payout of the belt. Thus as braided tube 101 contracts, it pulls any slack out of seat belt system 110. The occupant is thus provided with a pretensioned seat belt, which restricts the forward motion of the occupant and reduces primary injuries.

Further, the male portion of the buckle assembly 105 can be located on the lap belt 102 using rip-stitching or a locating snap or button. When a collision occurs and upon inflation, the locating attachment between lap belt 102 and buckle 105 releases, allowing the lap portion to pull tight, thereby further restricting the motion of the occupant and preventing the occupant from sliding under the lap belt (i.e., submarining).

Braided tube 101 is not stowed under any belt member. This design allows the tube to inflate evenly without experiencing roll-out problems. Seam splitting problems common to inflating bladders are also avoided because braided tube 101 is a seamless structure.

When fully inflated, braided tube 101 has a diameter of approximately 4 to 5 inches and a relative internal pressure of approximately 1 to 4 bars (2 to 5 bars absolute pressure). Due to increased friction, as the area of contact of inflated braided tube 101 with the occupant increases, inflated braided tube 101 helps to further restrict occupant motion. Unlike conventional 3-point seat belt systems, the present invention additionally helps lessen or prevent secondary belt-inflicted injuries by providing a substantially larger restraint surface area for the occupant's body, which helps to distribute belt load forces.

Additionally, the present invention provides side impact crash protection from head injury by restricting head movement, preventing the occupant's head from striking the window, the side of the vehicle, or any intruding objects.

Figure 3A:
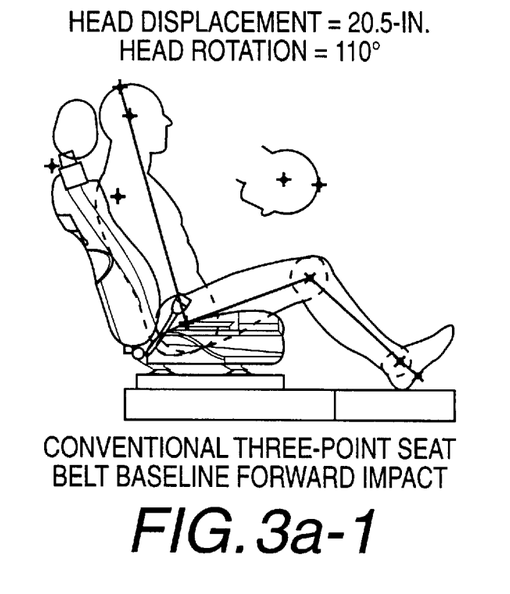
FIG. 3a is a schematic diagram showing the relative distance of the head displacement and the degree of head rotation during equivalent simulated forward-impact crash tests in which a conventional seat belt, a first air belt inflated to a relative pressure of 1 bar, a second air belt inflated to a relative pressure of 3 bars, and the present invention during the tests summarized in Table 1.
FIG. 3b is a schematic diagram showing the relative distance of the head displacement and the degree of head rotation during equivalent simulated side-impact crash tests in which a conventional seat belt, a first air belt inflated to a relative pressure of 1 bar, a second air belt inflated to a relative pressure of 3 bars, and the present invention during the tests summarized in Table 1.
Figure 3A:
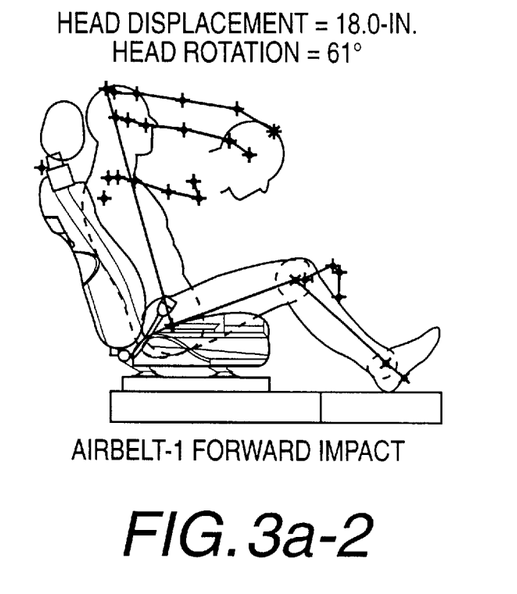
Figure 3A:
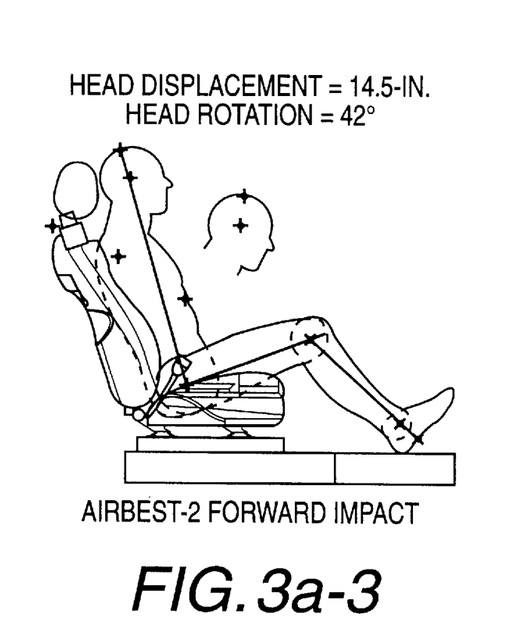
Figure 3A:
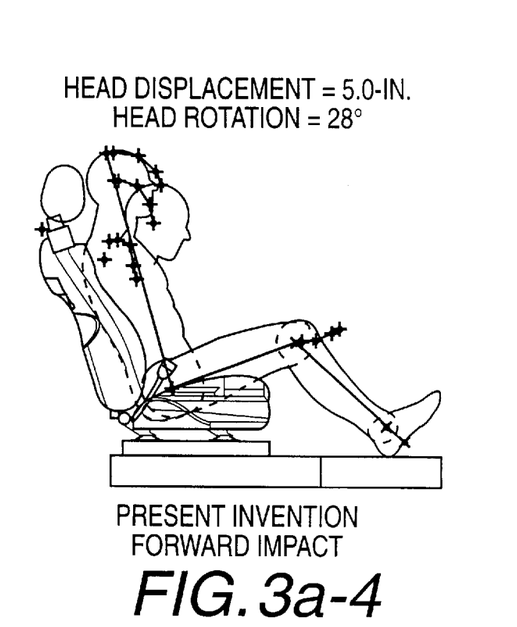
Figure 3B:
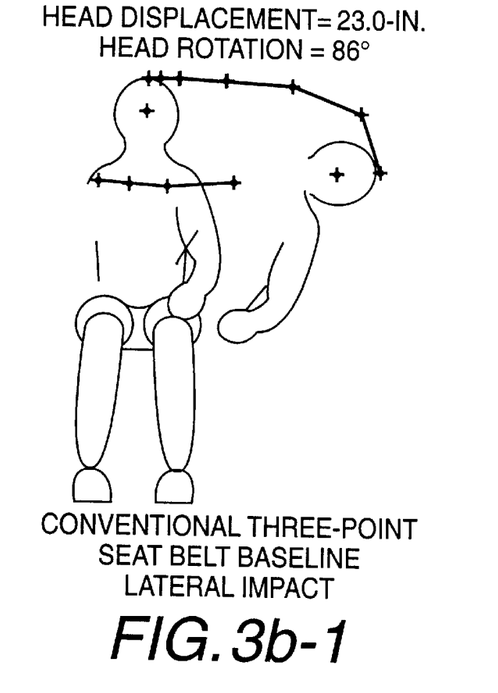
Figure 3B:
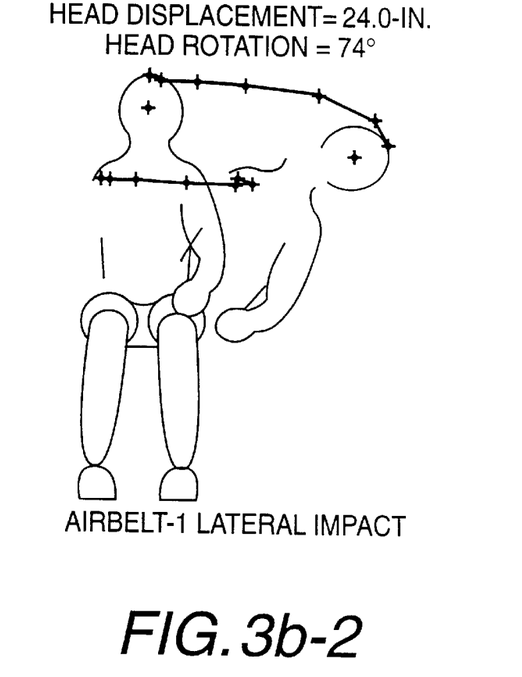
Figure 3B:
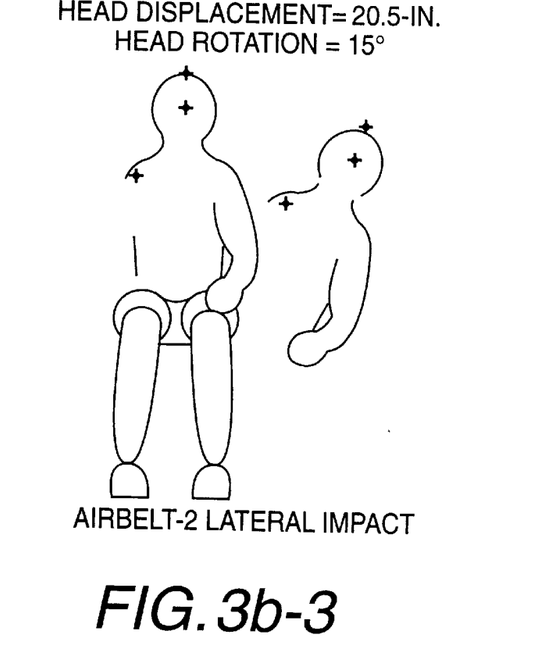
Figure 3B:
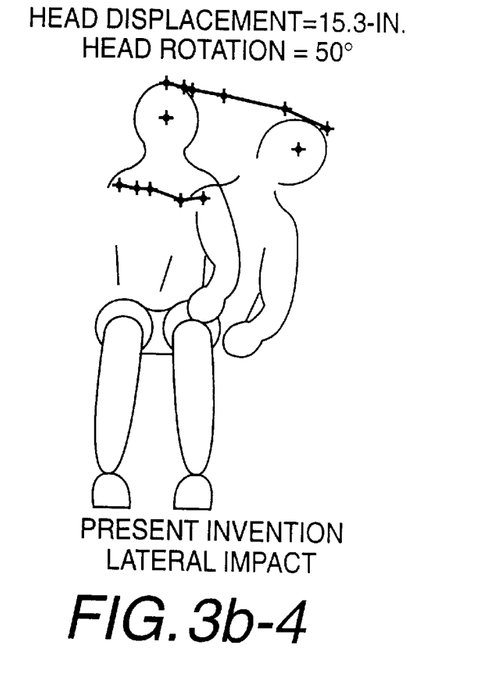

FIGS. 3a and 3b illustrate the results of simulated crash tests. These figures demonstrate that the present invention is more effective in limiting forward and side head displacement in frontal and side impacts, respectively, than are conventional prior art three-point seat belts and air belts fabricated from conventional materials.

The gas generator 122 used in the invention is preferably similar to those currently used in automotive side-impact as opposed to frontal air bags. This is due to the relatively smaller volume and faster filling requirements of side-impact air bags as opposed to frontal air bags. Gas generators invention must inflate braided tube 101 to a relative pressure of approximately 1.5 bars (2.5 bars absolute) within 10 to 15 milliseconds.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. For example, one obvious use of the invention is in the rear seat of automobiles. In this application the torso belt retractor could mount to the rear package shelf, C-pillar area or other structural member. The gas generator could also mount to the rear package shelf or even in the trunk of the vehicle. Of course, these components could also be mounted to the seat back structure as in the front seat application. The scope of the invention is to be defined only by the claims appended hereto, and by their equivalents.

TABLE I

OCCUPANT RESTRAINT TEST RESULTS

|  | 3 pt | Air Belt 1 | Air Belt 2 | Present Invention |
|---|---|---|---|---|
| FRONTAL IMPACT | | | | |
| Displacement (inches) | 20.5 | 18.0 | 14.5 | 5.0 |
| Rotation, (degrees) | 110 | 61 | 42 | 28 |
| HIC | 129 | 406 | 194 | 99 |
| $C_R$, (g's) | 32 | 51 | 27 | 26 |
| Torso belt, (lbs) | 1,466 | 790 | 618 | 500 |
| Lap belt (lbs) | 1,534 | 1,294 | 1,193 | 554 |
| Pressure (psi) | NA | 16.0 | 45.4 | 33.4 |

TABLE I-continued

OCCUPANT RESTRAINT TEST RESULTS

|  | 3 pt | Air Belt 1 | Air Belt 2 | Present Invention |
|---|---|---|---|---|
| LATERAL IMPACT | | | | |
| Displacement (inches) | 23.0 | 24.0 | 20.5 | 15.3 |
| Rotation (degrees) | 86 | 74 | 15 | 50 |
| HIC | 121 | 126 | 73 | ND |
| $C_R$ (g's) | 53 | 20 | ND | 35 |
| Torso belt (lbs) | 709 | 421 | 410 | 417 |
| Lap belt (lbs) | 595 | 693 | 700 | 383 |
| Pressure (psi) | NA | 17.3 | 40.6 | 31.3 |

What we claim is:

1. A seat restraint system on a vehicle seat in a vehicle comprising:
   (a) an inflatable torso belt which assumes a flat configuration and which acts as a conventional torso section of a seat belt prior to inflation, having an inflatable portion of a first length, said inflatable portion, upon inflation, forming a relatively large diameter tube having a second length, said second length being at least about 20% less than the first length;
   (b) a buckle assembly, wherein a first portion of the buckle assembly is attached to the torso belt and wherein a second portion of the buckle assembly is anchored to the vehicle;
   (c) a lap belt attached to the first portion of the buckle assembly;
   (d) a first inertial reel attached to the lap belt anchored to the vehicle, said first inertial reel locking on impact to prevent payout of the lap belt;
   (e) a second inertial reel anchored to the vehicle and attached to the inflatable torso belt, said second inertial reel locking on impact to prevent a payout of the torso belt,
   wherein:
      the torso belt is designed such that, after inflation, a portion of the inflatable torso belt lies over the top of the vehicle seat,
      the inflatable portion of the torso belt passes through a constraint, such that portions of the torso belt on both sides of the constraint are inflatable, and
      the inflatable portion is not vented after inflation, and such that the inflatable portion of the torso belt lying over the top of the vehicle seat would push an occupant of the seat down into the seat, thus controlling the position of the occupant during a collision.

2. The seat restraint system of claim 1, further comprising a gas generator mounted in the vehicle seat, said gas generator being in fluid communication with the inflatable portion of the torso belt.

3. The seat restraint system of claim 1, wherein the constraint is a D-ring which comprises means for mounting the D-ring to the top of a seat in the vehicle.

4. The seat restraint system of claim 1, wherein said second inertial reel is mounted in the vehicle seat.

5. The seat restraint system of claim 1, wherein after inflation the inflatable portion of the torso belt restrains lateral displacement of an occupant's head.

6. The seat restraint system of claim 1, wherein the torso belt is inflated by inflating a braided tube, and wherein, upon inflation, said braided tube contracts in length and increases in diameter, thus reducing the length of the torso section of the seat belt from said first length to said second length.

7. The seat restraint system of claim 1, further comprising a crash sensor and means for generating inflating gas, wherein the crash sensor, upon detecting an impact, initiates the generation of inflating gas by the means for generating inflating gas.

8. The seat restraint system of claim 1, wherein a portion of the inflatable portion of the inflatable torso belt is routed down the back of the vehicle seat.

9. The seat restraint system of claim 1, wherein the inflatable portion of the torso belt is a seamless structure that is designed to deploy evenly without being constrained by portions of the system.

10. The seat restraint system of claim 1, wherein the inflated portion of the torso belt is not vented after inflation.

11. A seat restraint system on a seat in a passenger vehicle comprising:
   (a) an inflatable torso belt comprised of a first portion, a second portion and a third portion;
   (b) a buckle assembly attached to the first portion of the torso belt;
   (c) a first inertial reel attached to the third portion of the torso belt, said inertial reel locking at impact and preventing further payout of the inflatable torso belt, said first inertial reel being anchored to the vehicle; and
   (d) a lap belt attached to the buckle assembly at a first end of the lap belt, and attached to a second inertial reel at a second end of the lap belt, said second inertial reel being anchored to the vehicle,
   wherein:
      the second portion of the torso belt comprises the inflatable portion of the torso belt,
      the second portion of the torso belt extends from flat webbing comprising the first portion of the torso belt through a constraint positioned at an apex of the torso belt, and extends from the constraint at the apex of the torso belt down the back of the seat to the third portion of the torso belt,
      upon inflation, the second portion of the torso belt contracts in length by at least about 20% and restricts head movement after either frontal or side impacts, thus reducing the extent and severity of both primary and secondary injuries, and
      the inflatable portion is not vented after inflation.

12. The seat restraint system of claim 11, wherein the constraint is a D-ring.

13. The seat restraint system of claim 12, wherein the D-ring is attached to the top of the seat.

14. The seat restraint system of claim 11, wherein the first inertial reel is mounted inside the vehicle seat, and the third portion of the inflatable torso belt is routed inside the seat to the first inertial reel.

15. The seat restraint system of claim 14, further comprising a gas generator mounted inside the seat in fluid communication with the second portion of the inflatable torso belt.

16. The seat restraint system of claim 11, wherein the second portion of the torso belt comprises a braided tube.

17. The seat restraint system of claim 11, wherein the second portion of the torso belt contracts in length by no more than about 39%.

18. The seat restraint system of claim 11, wherein the attachment of the lap belt to the buckle assembly is releasable, such that upon inflation and contraction of the inflatable portion of the torso belt, the lap belt is pulled tight.

19. The seat restraint system of claim 16, wherein the unconstrained decrease of the braided tube length is about 21.5% to 33.5%.

20. The seat restraint system of claim 11, wherein the second portion of the torso belt is a seamless structure that deploys evenly without being constrained by other components of the restraint system.

21. A seat restraint system on a rear seat in a passenger vehicle comprising:
(a) an inflatable torso belt comprised of a first portion, a second portion and a third portion;
(b) a buckle assembly attached to the first portion of the torso belt;
(c) a first inertial reel attached to the third portion of the torso belt, said first inertial reel locking at impact and preventing further payout of the inflatable torso belt, said first inertial reel being anchored to the vehicle; and
(d) a lap belt attached to the buckle assembly at a first end of the lap belt, and attached to a second inertial reel at a second end of the lap belt, said second inertial reel being anchored to the vehicle,
wherein:
the second portion of the torso belt comprises the inflatable portion of the torso belt,
the second portion of the torso belt extends from flat webbing comprising the first portion of the torso belt through a constraint adjacent to the top of the rear seat to the third portion of the torso belt,
wherein, upon inflation, the second portion of the torso belt contracts in length by at least about 20% and would push an occupant of the seat down into the seat, thus controlling the occupant in the seat during a collision,
and wherein the inflatable portion is not vented after inflation.

22. The seat restraint system of claim 21, wherein the first inertial reel is mounted to one of a rear package shelf and a C-pillar.

23. The seat restraint system of claim 21, wherein the second portion of the torso belt contracts in length by no more than about 39%.

24. The seat restraint system of claim 21, wherein the second portion of the torso belt comprises an inflatable braided tube.

25. The seat restraint system of claim 21, further comprising a gas generator mounted in one of a rear package shelf, the rear seat back and the vehicle's trunk.

26. The seat restraint system of claim 21, wherein after inflation the inflatable portion of the torso belt restrains lateral displacement of an occupant's head.

27. A seat restraint system on a vehicle seat in a vehicle comprising:
(a) a short strap anchored to the vehicle on the inboard side of the vehicle seat at one end and attached to a first portion of a buckle assembly at a second end;
(b) a belt attached at a first end to a first inertial reel at the outboard side of the vehicle seat and attached to a second portion of the buckle assembly at an intermediate position, said belt forming a lap belt for a first portion of the belt between the inertial reel and the second portion of the buckle assembly, and forming a torso belt for a second portion of the belt beyond the buckle assembly, wherein said torso portion of the belt is inflatable and is routed through a constraint over the top of the vehicle seat and is attached to a last portion of the belt;
(c) a gas generator in fluid connection with the inflatable portion of the belt mounted inside the vehicle seat; and
(d) a second inertial reel anchored to the vehicle attached to the last portion of the belt,
wherein:
the inflatable portion of the belt is routed through a constraint over the top of the vehicle seat,
the inflatable portion of the belt reduces its length by at least about 20% when it is fully inflated in an unconstrained state, and
the inflatable portion of the belt is not vented after inflation.

28. The seat restraint system of claim 27, wherein the inflatable portion of the belt reduces its length by no more than about 39%.

29. The seat restraint system of claim 27, wherein the inflatable portion of the belt extends down the back of the seat.

30. The seat restraint system of claim 27, wherein the constraint is a D-ring mounted on the top of the vehicle seat.

31. The seat restraint system of claim 27, wherein the inflatable portion of the belt comprises a braided tube which serves to inflate the inflatable portion of the belt.

32. The seat restraint system of claim 31, wherein the braided tube comprises continuous high-strength fibers spirally wound around the circumference of the braided tube.

33. The seat restraint system of claim 32, wherein the continuous high strength fibers comprise a clockwise set of fibers which are spirally wound clockwise around the circumference of the tube, and a counterclockwise set of fibers which are spirally wound counterclockwise around the circumference of the tube, and wherein the maximum longitudinal angle of formed by the intersection of the clockwise fibers with the counterclockwise fibers is 110°.

34. A seat restraint system comprising a belt,
said belt comprising:
(a) a lap belt portion pivotally attached to a first inertial reel at a first side of a vehicle seat and attached to a first portion of a buckle assembly;
(b) an inflatable torso portion starting on the side of the first portion of the buckle assembly that is opposite to the lap portion of the belt, said inflatable portion of the belt being routed through a constraint over the top of the vehicle seat and down the back of the vehicle seat to a second inertial reel mounted in the vehicle seat;
and said seat restraint system further comprising:
(c) a gas generator fluidly connected to the inflatable torso portion of the belt;
(d) a strap attached at one end to a second portion of the buckle assembly, and anchored to the vehicle at the other end,
wherein the inflatable portion of the belt increases its diameter, and reduces its length by at least about 20%, when it is fully inflated in an unconstrained state,
wherein the lap belt portion of the belt is pulled taut as the inflatable portion of the belt is inflated, thus preventing submarining; and
wherein the inflatable portion of the belt is not vented after inflation, such that it continues to reduce the extent and severity of secondary injuries as well as reducing the extent and severity of primary injuries.

35. The seat restraint system of claim 34, wherein the inflatable portion of the belt comprises intersecting fibers, wherein the relative angular orientation of these intersecting fibers can be characterized by the longitudinal angle between the intersecting fibers, and wherein the longitudinal angle between the intersecting fibers increases by at least about 30° as the belt is fully inflated in its unconstrained state.

36. The seat restraint system of claim 35, wherein the longitudinal angle between the intersecting fibers increases by no more than about 80° as the belt is fully inflated in its unconstrained state.

37. The seat restraint system of claim 36, wherein the longitudinal angle ranges from about 100° to about 110° when the belt is fully inflated in its unconstrained state.

38. The seat restraint system of claim 35, wherein the intersecting fibers form a braided tube.

39. The seat restraint system of claim 34, wherein the gas generator is mounted inside the vehicle seat.

40. The seat restraint system of claim 34, wherein the constraint is a D-ring mounted to the top of the vehicle seat.

41. A method for reducing the extent and severity of injuries to passengers seated in a vehicle seat of a vehicle comprising:
   (a) anchoring a short strap to the vehicle on the inboard side of the vehicle seat at one end of the short strap and attaching the short strap to a first portion of a buckle assembly at the other end of the short strap;
   (b) attaching a belt at a first end to a first inertial reel at the outboard side of the vehicle seat, and attaching the belt to a second portion of the buckle assembly at an intermediate position, thus forming a lap belt between the inertial reel and the second portion of the buckle assembly, and a torso belt for the remaining portion of the belt, the torso portion of the belt comprising an inflatable portion;
   (c) routing the inflatable portion of the belt across the vehicle seat and through a constraint at the top of the vehicle seat;
   (d) anchoring a second inertial reel to the vehicle, and attaching said second inertial reel to a second end of the belt,
   (e) detecting an impact;
   (f) using a gas generator in fluid connection with an inflatable portion of the belt to inflate the inflatable portion of the belt;
   wherein:
      the second inertial reel is mounted in the vehicle seat,
      the inflatable portion of the belt reduces its length by at least about 20% when it is fully inflated in an unconstrained state, and
      the inflatable portion of the belt is not vented after inflation.

42. The method of claim 41, wherein the inflatable portion of the belt comprises intersecting fibers, and wherein the longitudinal angle between the intersecting fibers increases by at least about 30° as the belt is fully inflated in its unconstrained state.

43. The method of claim 42, wherein the longitudinal angle ranges from about 100° to about 110° when the belt is fully inflated in its unconstrained state.

44. The method of claim 42, wherein the intersecting fibers form a braided tube.

45. A seat restraint system comprising:
   (a) a belt having a lap belt portion, and torso belt portion and a back-of-the-seat portion, wherein the lap belt portion is pivotally attached to a first inertial reel at a first side of a vehicle seat, and wherein the belt is attached to a first portion of a buckle assembly at the end of the lap portion of the belt and at the beginning of the torso belt portion of the belt;
   (b) an inflatable tubular structure comprising the torso belt portion and at least part of the back-of-the-seat portion of the belt, said inflatable tubular structure being routed through a constraint over the top of the vehicle seat towards a second inertial reel mounted in the vehicle seat;
   (c) a gas generator fluidly connected to the inflatable tubular structure;
   (d) a strap attached at one end to a second portion of the buckle assembly, and anchored to vehicle structure at the other end,
   wherein the inflatable tubular structure increases its diameter, and reduces its length by at least about 20%, when it is fully inflated in an unconstrained state,
   wherein the inflatable tubular structure comprises intersecting fibers, and wherein the longitudinal angle between the intersecting fibers increases by at least about 30° as the inflatable tubular structure is fully inflated in its unconstrained state, and
   wherein the inflatable tubular structure is not vented after inflation, such that it reduces the extent and severity of secondary injuries as well as reducing the extent and severity of primary injuries.

46. The seat restraint system of claim 45, wherein the intersecting fibers form a braided tube.

47. The seat restraint system of claim 45, wherein the longitudinal angle between the intersecting fibers increases to an angle in the range of about 100° C. to about 110° C., when the inflatable tubular structure is fully inflated i its unconstrained state.

48. The seat restraint system of claim 45, wherein the gas generator is mounted in the vehicle seat.

49. The seat restraint system of claim 45, wherein the inflatable tubular structure is a seamless structure designed to deploy evenly in the event of an impact, without being constrained by other portions of the restraint system.

50. The seat restraint system of claim 45, wherein the inflatable tubular structure extends down the back of the vehicle seat.

* * * * *